United States Patent [19]

Peng

[11] Patent Number: 6,108,968
[45] Date of Patent: Aug. 29, 2000

[54] DEVICE FOR EXTERMINATING GARDEN PESTS

[76] Inventor: Hai-Sung Peng, No. 5, Hsin Kao Rd., Tai-Ping, Taichung, Taiwan

[21] Appl. No.: 09/162,994

[22] Filed: Sep. 30, 1998

[51] Int. Cl.[7] ............................. A01G 17/12; A01M 1/18; A62B 35/00
[52] U.S. Cl. .................. 47/24; 43/108; 119/860
[58] Field of Search ............................. 43/108; 47/23–25; 119/860, 865

[56] References Cited

U.S. PATENT DOCUMENTS

| | | | |
|---|---|---|---|
| 356,389 | 1/1887 | Woodward | 47/24 |
| 569,083 | 10/1896 | Belknap | 47/24 |
| 1,345,690 | 7/1920 | Perl | 47/24 |
| 1,790,605 | 1/1931 | Thorbecke | 47/24 |
| 2,219,569 | 10/1940 | Vanderhoof | 119/860 |
| 2,389,870 | 11/1945 | Reevely | 47/24 |
| 2,593,781 | 4/1952 | Meis | 47/24 |
| 2,791,202 | 5/1957 | Doyle | 119/860 |
| 3,420,617 | 1/1969 | Kimm | 47/24 |
| 3,811,413 | 5/1974 | Scherpenborg | 119/860 |
| 4,047,505 | 9/1977 | McAndless | 119/860 |
| 4,068,624 | 1/1978 | Ramney | 119/860 |
| 4,091,766 | 5/1978 | Colliard | 119/860 |
| 4,719,876 | 1/1988 | Wilken | 119/860 |
| 4,900,876 | 2/1990 | Bushman et al. | 119/860 |
| 4,930,451 | 6/1990 | Miller et al. | 119/860 |
| 5,144,913 | 9/1992 | Yasui | 119/860 |
| 5,146,875 | 9/1992 | Bolt | 119/860 |
| 5,211,949 | 5/1993 | Sayler | 424/402 |
| 5,224,967 | 7/1993 | Rolf et al. | 47/58.1 |
| 5,408,782 | 4/1995 | McConnell | 182/187 |
| 5,555,848 | 9/1996 | Trujillo et al. | 119/654 |
| 5,591,263 | 1/1997 | Chin et al. | 118/200 |

*Primary Examiner*—Michael J. Carone
*Assistant Examiner*—Fredrick T. French, III
*Attorney, Agent, or Firm*—Rosenberg, Klein & Lee

[57] ABSTRACT

A device for exterminating pests includes a belt consisted of the first side plate and the second side plate which is connected to the first side plate on the two respective first sides thereof so that an opening is defined between the two respective second sides of the two side plates. Each of the first side plate and the second side plate has an engaging device attached to the inside thereof so as to be engaged with each other. Insecticide is received between the first side plate and the second side plate, and the belt is wrapped around the trunk of trees.

2 Claims, 7 Drawing Sheets

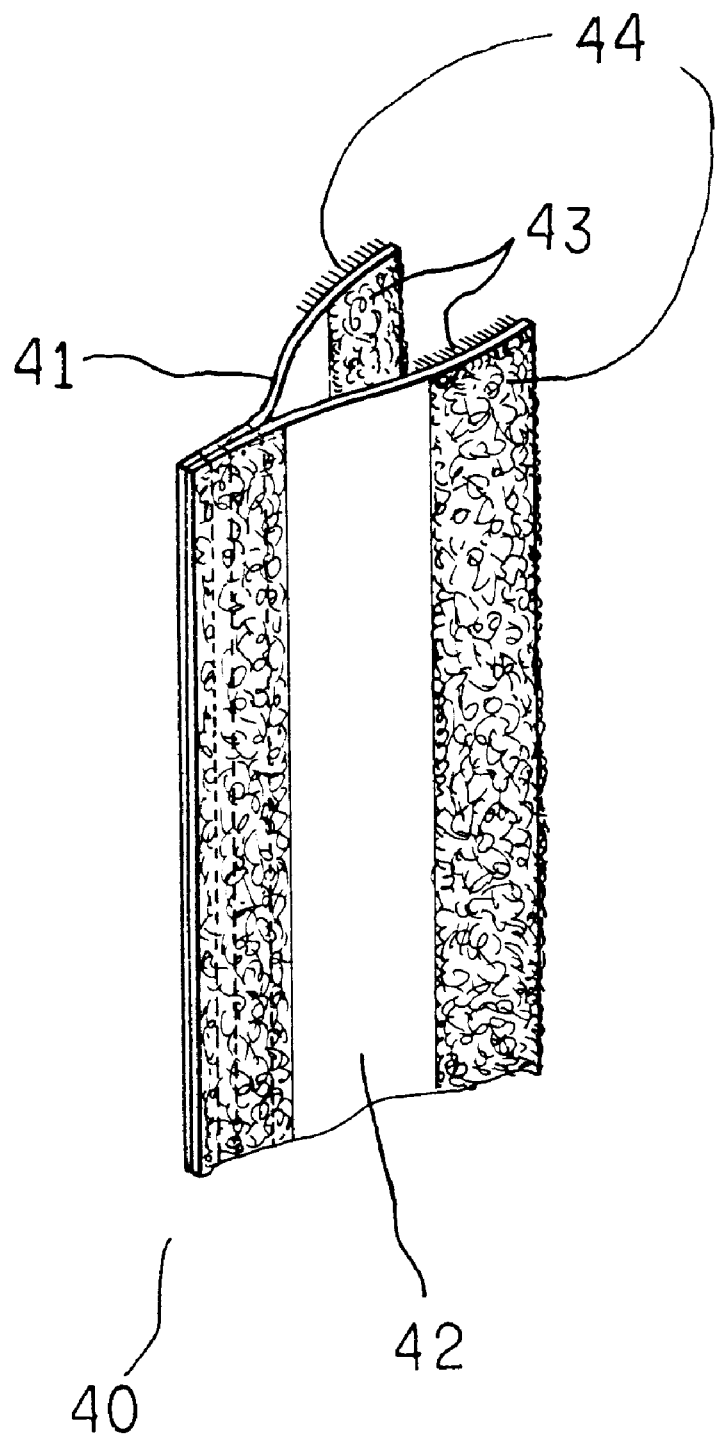
F I G. 4

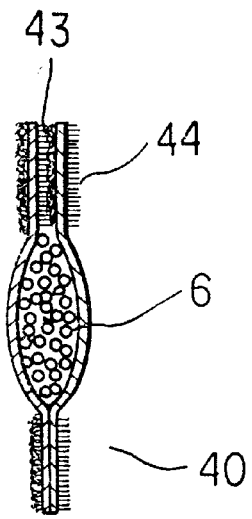
F I G. 6
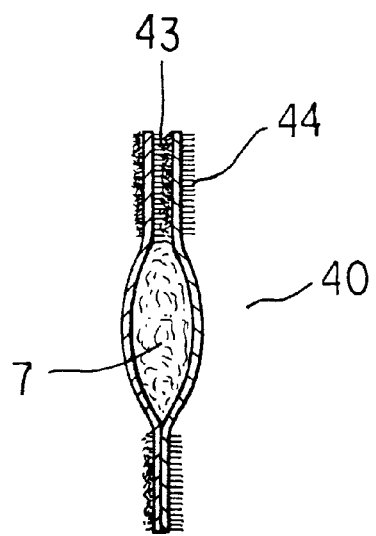
F I G. 7

DEVICE FOR EXTERMINATING GARDEN PESTS

FIELD OF THE INVENTION

The present invention relates to a device for exterminating pests for fruit trees, and more particularly, to a belt wrapped around the trunk and having two plates disengagably connected to each other between which the insecticide is received.

BACKGROUND OF THE INVENTION

FIGS. 1 to 3 show a conventional device for exterminating garden pests and which is disclosed in Japanese Utility patent Application No. 4-64212. The application disclosed that the pests lay their eggs 11 in the earth 13 and when the caterpillars 12 grow up, the caterpillars 12 penetrate the earth and crawl to the top of the fruit tree along the trunk 3 to eat the fruits 31. In order to prevent the caterpillars 12 crawl to the top of the fruit tree, the Japanese Patent Application disclosed a fabric belt 2 which is composed of an upper layer 21 and a lower layer 22 with an absorbent 23 received between the upper layer 21 and the lower layer 22. The belt 2 is wrapped around the trunk 3 and liquid insecticide is absorbed in the absorbent 23 of the belt 2 so that the caterpillars 12 will adhere the liquid insecticide before the caterpillars 12 access the fruits 31. However, only the liquid insecticide can be used in the belt 2 so that the density of the liquid insecticide will be reduced in rainy days, and vaporized in sunny days. Furthermore, the upper layer 21 and the lower layer 22 are adhered only by water-resolved glue so that the upper layer 21 and the lower layer 22 are easily separated so that the belt 2 cannot reach the required purpose.

The present invention intends to provide a belt-type device for exterminating pests for fruit trees and has two side plates which are connected to each other by hook-loop means, wherein insecticide is received between the two side plates. Each of the two side plates has a hook-loop means attached to both sides thereof so that the two side plates are conveniently separated to replace the insecticide in the belt. The present invention has arisen to mitigate and/or obviate the shortcomings of the conventional belt for exterminating pests.

SUMMARY OF THE INVENTION

In accordance with one aspect of the present invention, a belt for exterminating pests comprises a first side plate and a second side plate which is connected to the first side plate along the two respective first sides thereof so as to define an opening along the two respective second sides thereof. Each of the first side plate and the second side plate has an engaging means attached to the inside of the two respective second sides thereof so that the opening is sealed by engaging the two engaging means with each other.

An object of the present invention is to provide a belt for exterminating pests, wherein the belt has an opening defined along one of two sides thereof so that insecticide is received in the belt via the opening, and the opening is sealed by hook-loop means.

Another object of the present invention is to provide a belt for exterminating pests, wherein the insecticide can be maintained in the belt for a longer period of time so as to increase the effect of exterminating pests and decrease the amount of the insecticide such that the environment can be protected.

Yet another embodiment of the present invention is that the belt can be reused so that the cost of manufacturing the belt can be reduced and this meets the requirement of sense of environment protection. Further objects, advantages, and features of the present invention will become apparent from the following detailed description with appropriate reference to the accompanying drawings.

BRIEF DESCRIPTION OF THE DRAWINGS

FIG. 4 is a perspective view of a section of the device for exterminating pests in accordance with the present invention;

FIG. 6 is a side elevational view, partly in section, of the belt in accordance with the present invention, wherein the insecticide particles are received in the belt;

FIG. 7 is a side elevational view, partly in section, of the belt in accordance with the present invention, wherein the insecticide paste is received in the belt;

DETAILED DESCRIPTION OF THE PREFERRED EMBODIMENTS

Figure 1:
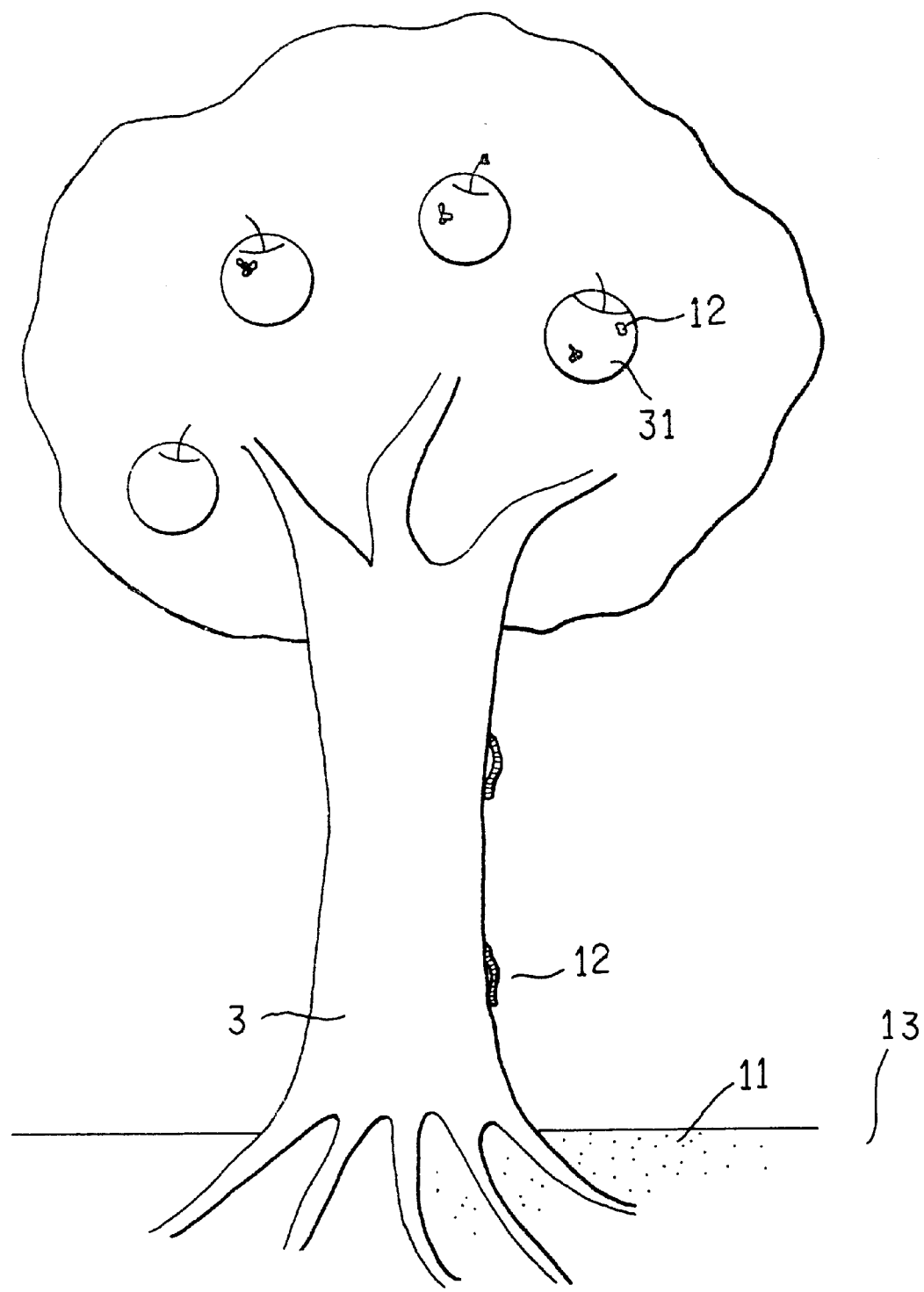
FIG. 1 is an illustrative view to illustrate eggs of pests in the earth and caterpillars crawling on the trunk of trees to eat fruits.
Figure 2:
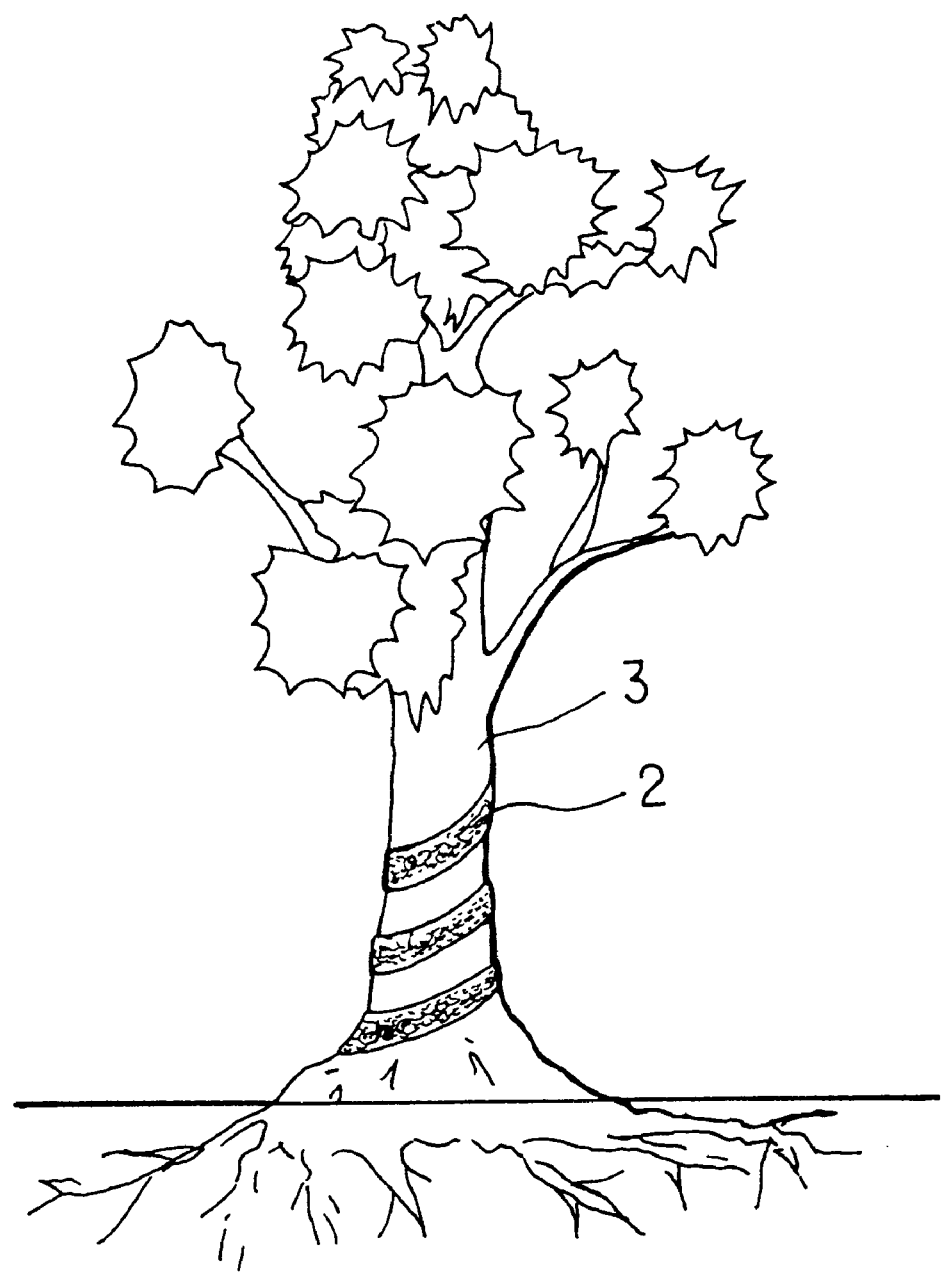
FIG. 2 is an illustrative view to illustrate the conventional pest exterminating belts are wrapped on the trunk of the tree.
Figure 3:
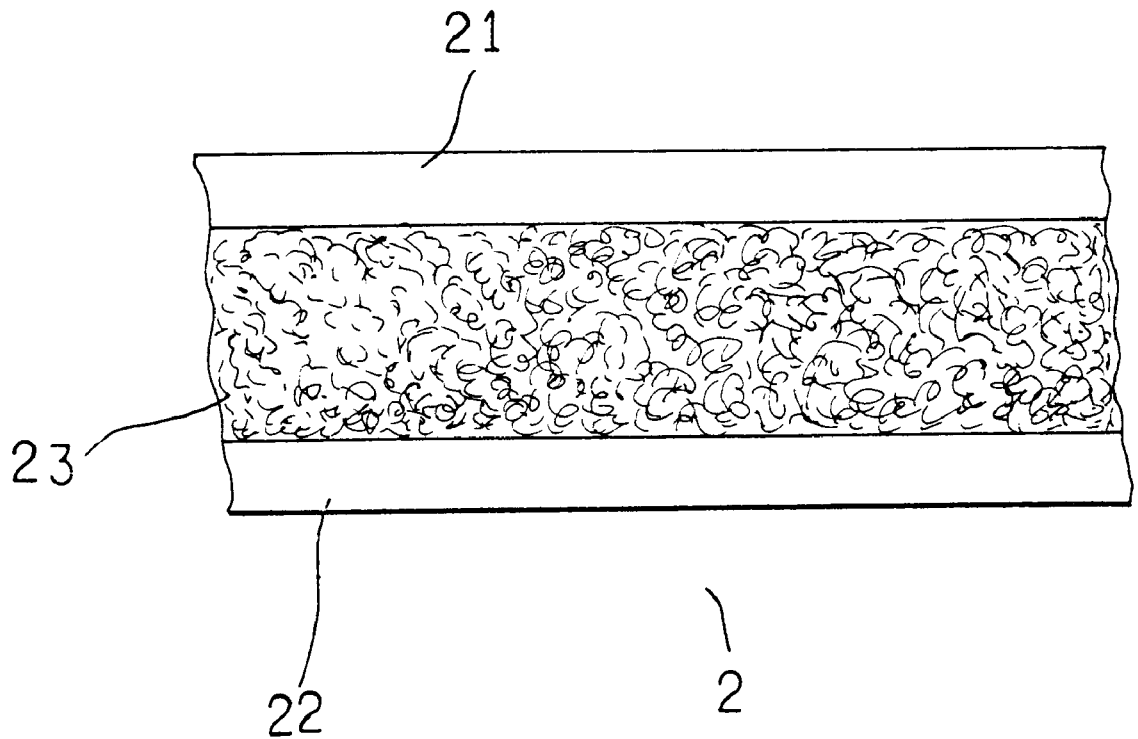
FIG. 3 is a side elevational view, partly in section, of a section of the conventional pest exterminating belt.
Figure 5:
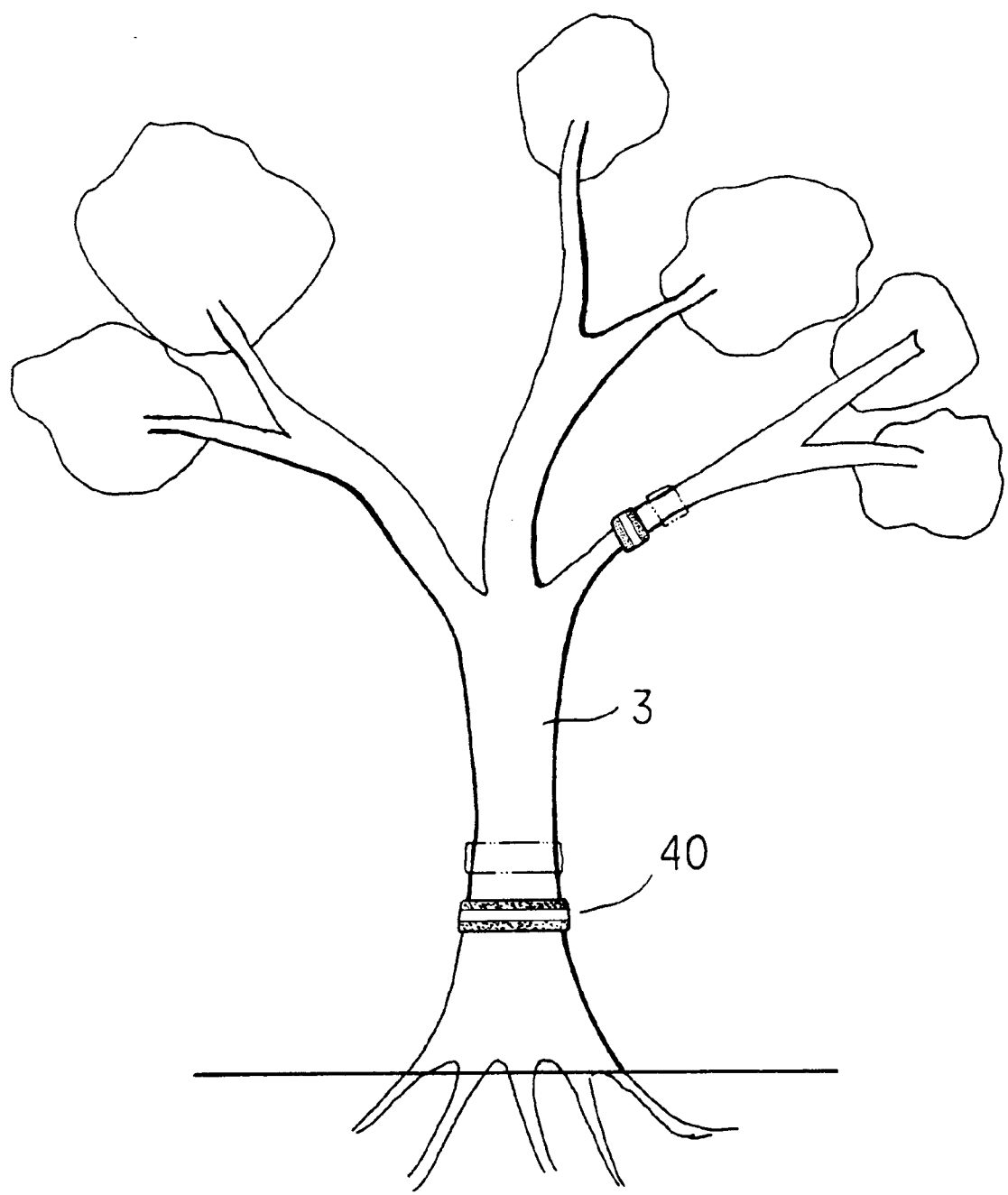
FIG. 5 is an illustrative view to illustrate the pest exterminating belts of the present invention are wrapped on the trunk of the tree.
Figure 8:
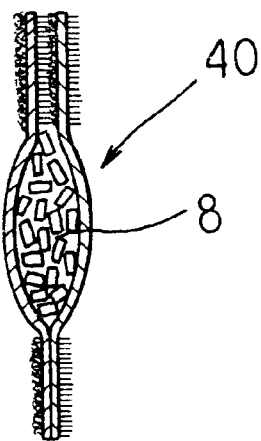
FIG. 8 is a side elevational view, partly in section, of the belt in accordance with the present invention, wherein the insecticide capsules are received in the belt.

Referring to FIGS. 4 and 5, the device for exterminating pests in accordance with the present invention is a belt 40 having two closed ends and comprising a first side plate 41 and a second side plate 42 which is connected to the first side plate 41 along the two respective first sides thereof so as to define an opening between the two respective second sides of the first side plate 41 and the second side plate 42, and the two closed ends of the belt 40. Insecticide is received between the first side plate 41 and the second side plate 42 via the opening. Each of the first side plate 41 and the second side plate 42 has an engaging means 43, such as the hook-loop means, attached to the inside of the two respective second sides thereof so that the opening can be sealed by engaging the two engaging means 43 with each other. Each of the first side plate 41 and the second side plate 42 has an engaging means 44 attached to the outside thereof so that the belt 40 can be wrapped around the trunk 3 of the tree by engaging the engaging means 44 to each other.

Referring to FIG. 6, the belt 40 may receive insecticide particles 6 therein or insecticide paste 7 therein as shown in FIG. 7. Insecticide capsules 8 are also suitable be received in the belt 40. It is to be noted that the material of the first side plate 41 and the second side plate 42 is suitable to absorb insecticide liquid which is sprayed by a piston sprayer for example.

Figure 9:
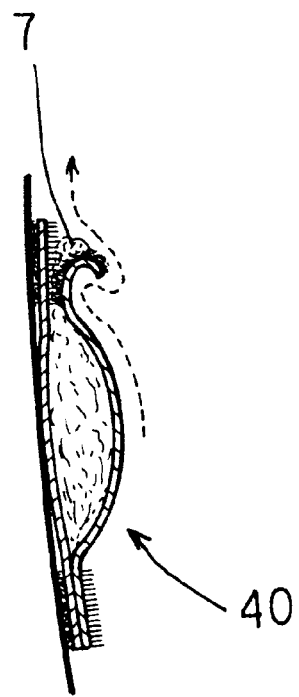
FIG. 9 is an illustrative view to illustrate the opening of the pest exterminating belt of the present invention is slightly opened to let the insecticide paste be exposed.

The insecticide is conveniently replaced by separating the second sides of the first side plate 41 and the second side plate 42. Furthermore, referring to FIG. 9, the opening can be slightly opened to let some of the insecticide paste 7 be exposed so that when the caterpillars crawl across the belt 40 as shown in phantom lines will adhere the insecticide paste 7 so as to prevent from the caterpillars from reaching to the top of the tree.

The belt of the present invention maintains the insecticide for a longer period of time so that the effect of exterminating pests is increased. In the meanwhile, the amount of the insecticide to be used can be reduced and the environment can be protected. Furthermore, the insecticide material can be easily supplied in the belt so that the belt can be used repeatedly, this meets the requirement of sense of environment protection and the cost of manufacturing the belt is also reduced.

The invention is not limited to the above embodiment but various modification thereof may be made. It will be understood by those skilled in the art that various changes in form and detail may made without departing from the scope and spirit of the present invention.

What is claimed is:

1. A belt for exterminating pests from trees, comprising:

a longitudinally extended first member being of sufficient length to encircle a tree trunk, said first member having first and second opposing longitudinal edges and an inside face and an outside face;

a longitudinally extended second member having a length substantially equal to said length of said first member and disposed in overlaying relationship thereon, said second member having first and second opposing longitudinal edges and an inside face juxtaposed over said inside face of said first member and an outside face, said first longitudinal edge of said second member being affixed to said first longitudinal edge of said first member to form a longitudinally extended cavity between said first and second members;

a pair of first hook and loop fastening elements of a pair of first hook and loop fasteners respectively secured to said outside face of said first member adjacent said first and second longitudinal edges of said first member;

a pair of second hook and loop fastening elements of said pair of first hook and loop fasteners respectively secured to said outside face of said second member adjacent said first and second longitudinal edges of said second member, said pair of second hook and loop fastening elements being complementary to said pair of first hook a nd loop fastening elements;

a second hook and loop fastener having one element thereof secured to said inside face of said first member adjacent said second longitudinal edge thereof and the other element secured to said inside face of said second member adjacent said second longitudinal edge thereof to form a releasable closure between said second longitudinal edges of said first and second members to define a closable longitudinally extended access to said longitudinally extended cavity; and, an insecticide composition inserted into said longitudinally extended cavity through said longitudinally extended access, wherein said belt is wrapped about a tree trunk subsequent to insertion of said insecticide composition.

2. The belt as recited in claim 1 where said insecticide composition is in a form selected from the group consisting of particulates, paste, and capsules.

* * * * *